(12) United States Patent
Gross et al.

(10) Patent No.: US 10,310,459 B2
(45) Date of Patent: Jun. 4, 2019

(54) ELECTRIC LOADSHAPE FORECASTING BASED ON SMART METER SIGNALS

(71) Applicant: Oracle International Corporation, Redwood Shores, CA (US)

(72) Inventors: Kenny C. Gross, Escondido, CA (US); Mengying Li, La Jolla, CA (US); Benjamin P. Franklin, Jr., Jasper, GA (US)

(73) Assignee: Oracle International Corporation, Redwood Shores, CA (US)

( * ) Notice: Subject to any disclaimer, the term of this patent is extended or adjusted under 35 U.S.C. 154(b) by 67 days.

(21) Appl. No.: 15/715,692

(22) Filed: Sep. 26, 2017

(65) Prior Publication Data
US 2019/0094822 A1 Mar. 28, 2019

(51) Int. Cl.
| | | |
|---|---|---|
| G05D 3/12 | (2006.01) | |
| G05B 13/04 | (2006.01) | |
| H02J 3/00 | (2006.01) | |
| G05B 13/02 | (2006.01) | |

(52) U.S. Cl.
CPC ....... G05B 13/048 (2013.01); G05B 13/0265 (2013.01); H02J 3/00 (2013.01); *H02J 2003/003* (2013.01)

(58) Field of Classification Search
CPC .......................... Y02E 10/723; G05B 13/048
USPC ....................................................... 700/287
See application file for complete search history.

(56) References Cited

U.S. PATENT DOCUMENTS

| | | | | |
|---|---|---|---|---|
| 2010/0324962 | A1* | 12/2010 | Nesler ................. | G01R 21/133 705/7.36 |
| 2012/0330631 | A1* | 12/2012 | Emigholz ............ | G05B 13/048 703/2 |
| 2014/0277808 | A1* | 9/2014 | Irisarri .................. | G05B 15/02 700/295 |
| 2014/0324532 | A1* | 10/2014 | Ghosh ............... | G06Q 30/0202 705/7.31 |

(Continued)

OTHER PUBLICATIONS

Almeshaiei et al, "A methodology for Electric Power Load Forecasting", Jul. 27, 2011, Alexandria University, pp. 8 (Year: 2011).*

(Continued)

*Primary Examiner* — Suresh Suryawanshi
(74) *Attorney, Agent, or Firm* — Park, Vaughan, Fleming & Dowler LLP

(57) ABSTRACT

During operation, the system receives a set of input signals containing electrical usage data from a set of smart meters, wherein each smart meter gathers electrical usage data from a customer of the utility system. Next, the system uses the set of input signals to train an inferential model, which learns correlations among the set of input signals, and uses the inferential model to produce a set of inferential signals, wherein an inferential signal is produced for each input signal in the set of input signals. The system then uses a Fourier-based technique to decompose each inferential signal into deterministic and stochastic components, and uses the deterministic and stochastic components to generate a set of synthesized signals, which are statistically indistinguishable from the inferential signals. Finally, the system projects the set of synthesized signals into the future to produce a forecast for the electricity demand.

17 Claims, 5 Drawing Sheets

(56) References Cited

U.S. PATENT DOCUMENTS

| | | | |
|---|---|---|---|
| 2014/0336960 A1* | 11/2014 | Haghighat-Kashani | ............... G06Q 10/04 702/60 |
| 2015/0120269 A1* | 4/2015 | Dannecker | .......... G06F 17/5009 703/18 |
| 2016/0187395 A1* | 6/2016 | Bodas | ................... G01R 21/00 702/60 |
| 2017/0371308 A1* | 12/2017 | Ghosh | ................... G05B 15/02 |

OTHER PUBLICATIONS

Hoff, "Electric grid operators forecast load shapes to plan electricity supply", Jul. 22, 2106, US Energy Information Administration, pp. 2 (Year: 2016).*

Gotham et al, "Energy Forecasting Methods", Nov. 15, 2007, Purdue University, pp. 48 (Year: 2007).*

Philip, "Methods for Analyzing Electric Load Shape and its Variability", Aug. 25, 2010, Lawrence Berkeley National Laboratory, pp. 62 (Year: 2010).*

Ruderman et al, "Residential End-Use Load Shape Data Analysis", Apr. 1989, University of California, pp. 62 (Year: 1989).*

Crowley et al, "Weather Effects on Electricity Loads: Modeling and Forecasting", Dec. 12, 2005, The George Washington University, pp. 48 (Year: 2005).*

Gross et al.; "Spectral Decomposition and Reconstruction of Telemetry Signals from Enterprise Computing Systems", 2005 International MultiConference in Computer Science and Computer Engineering Conference on Computer Design (CDES'05), Jun. 2005.

* cited by examiner

ELECTRIC LOADSHAPE FORECASTING BASED ON SMART METER SIGNALS

BACKGROUND

Field

The disclosed embodiments generally relate to techniques for performing electricity demand forecasting to further the ongoing operations of a utility company. More specifically, the disclosed embodiments relate to a technique that facilitates improved electric loadshape forecasting based on demand-side data obtained from smart meter signals and/or customer information system (CIS) billing data and/or load research interval data.

Related Art

The daily operations of an electric utility, such as fuel resource planning and making strategic real-time decisions to balance the supply and demand for electricity, are strongly influenced by forecasts for electrical demand. There often exists a factor of 10 to 20 difference in cost between a utility's base load generation sources when compared with purchases made through the electrical grid at spot-market rates to ensure that customer demands are met. Such demand forecasts are used by electrical utilities to perform important operations, such as: demand-side management; storage maintenance and scheduling; integration of renewable energy sources; selling surplus power on the grid; coordinating the availability of cheaper power through alternative means, such as energy exchanges; creating bilateral electricity supply agreements; and minimizing the need to purchase expensive electricity from the grid at spot-market rates.

Real-time, short-term loadshape forecasting has become a topic of intense interest because of the significant cost savings that a utility can obtain through accurate forecasting of demand over the upcoming 15 minutes to four hours as well as more accurate day-ahead forecasts. Utilities do the best they can to obtain such forecasts from historical aggregate supply curves for metropolitan areas served by the utility. However, utilities only use aggregate supply-side information from power plants and roof-top solar collectors to produce such forecasts. At the present time, utilities do not use fine-grained data about the temperature-dependent electrical usage for individual customers. The lack of such fine-grained data adversely affects the accuracy of the resulting usage forecasts because weather can vary significantly across a region served by a utility. For example, there is a big difference in temperature between houses that are close to water and houses that are not close to water. The further inland a house is located, the larger the diurnal variations in temperature. A bulk feed out of a coal plant does not provide this type of fine-grained usage information.

Hence, what is needed is a technique for more accurately forecasting electrical demand without the inherent inaccuracies of existing forecasting techniques, which are based on aggregate supply-side information.

SUMMARY

The disclosed embodiments relate to a system that forecasts electricity demand for a utility system. During operation, the system receives a set of input signals containing electrical usage data from a set of smart meters, wherein each smart meter in the set gathers electrical usage data from a customer of the utility system. Next, the system uses the set of input signals to train an inferential model, which learns correlations among the set of input signals, and then uses the inferential model to produce a set of inferential signals, wherein the inferential model produces an inferential signal for each input signal in the set of input signals. The system then uses a Fourier-based decomposition-and-reconstruction technique, which decomposes each signal in the set of inferential signals into deterministic and stochastic components, and uses the deterministic and stochastic components to generate a set of synthesized signals, which are statistically indistinguishable from the inferential signals. Finally, the system projects the set of synthesized signals into the future to produce a forecast for the electricity demand for the set of utility customers.

In some embodiments, the system uses the forecast for the electricity demand to control a supply of electricity provided by the utility system.

In some embodiments, while controlling the supply of electricity provided by the utility system, the system does one or more of the following: controls an amount of electricity produced by one or more power plants in the utility system; purchases electricity for the utility system through a power grid; sells electricity produced by the utility system through the power grid; stores electricity for future use by the utility system; and makes plans to construct a new power plant for the utility system.

In some embodiments, while generating the set of synthesized signals, the system first generates a set of un-normalized signals. Next, the system performs an ambient-weather-normalization operation on the set of un-normalized signals to generate the set of synthesized signals, wherein the ambient-weather-normalization operation uses historical, current and predicted weather measurements and historical electrical usage data to adjust the set of un-normalized signals to account for effects of weather on the forecast for electricity demand.

In some embodiments, the set of input signals are advanced metering infrastructure (AMI) signals.

In some embodiments, the inferential model is trained using a nonlinear, nonparametric (NLNP) regression technique.

In some embodiments, the NLNP regression technique comprises a Multivariate State Estimation Technique (MSET).

In some embodiments, while using the Fourier-based decomposition-and-reconstruction technique to generate the set of synthesized signals, the system uses a telemetry parameter synthesis (TPSS) technique, which creates a high-fidelity synthesis equation that is used to generate the set of synthesized signals.

In some embodiments, the electrical usage data comprises kilowatt measurements and kilowatt-hour measurements.

DETAILED DESCRIPTION

Figure 1:
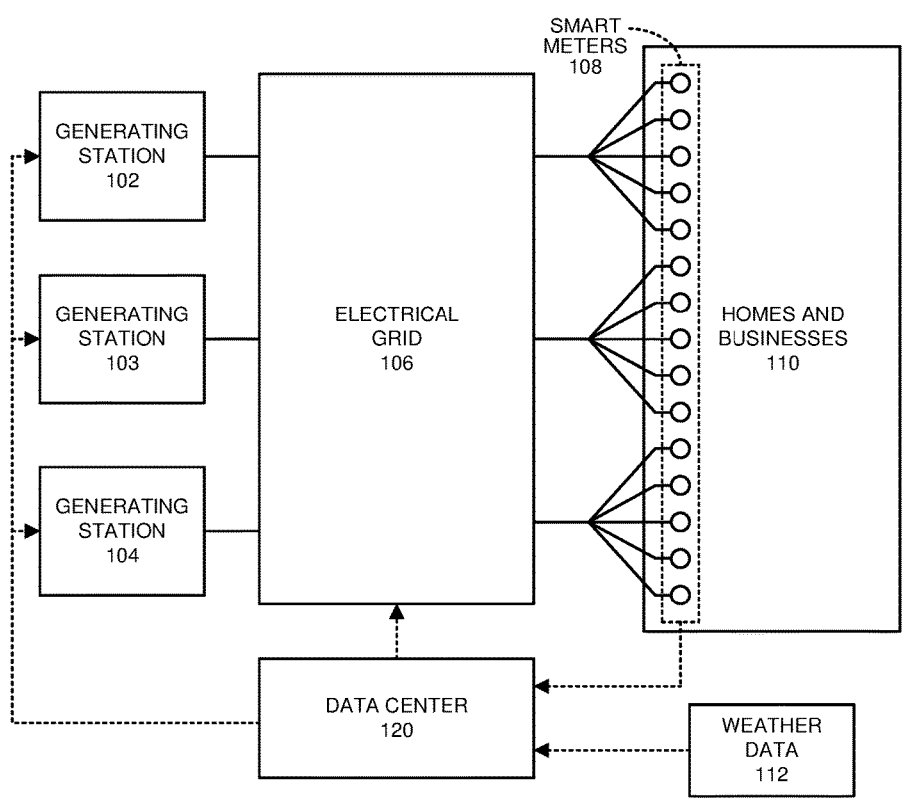
FIG. 1 illustrates an electrical utility system comprising a set of generating stations connected to homes and businesses through an electrical grid in accordance with the disclosed embodiments.

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

The disclosed new techniques provide an alternative to conventional supply-side aggregate-load forecasting. The new techniques start with advanced metering instructions (AMI) signals from smart meters associated with both residential and business customers. These AMI signals are processed using an advanced pattern-recognition technique, called MSET, which learns patterns of correlation among the AMI signals. Note that MSET is used in an "inferential" mode, which means that MSET generates an inferential signal for every signal being monitored. These inferential signals retain the serially correlated and cross-correlated structure of the AMI signals, but are filtered to remove stochastic, random components.

The "inferential signals" are then processed using a Fourier-based signal decomposition technique called TPSS, which decomposes the inferential signals into their deterministic and stochastic components, and then creates a high-fidelity synthesis equation that can be used to generate "synthesized signals," which accurately reflect the serially correlated structure of the inferential signals and are statistically indistinguishable from the original signals. Note that these high-fidelity TPSS signals accurately represent both the cross-correlation among signals and the historical serial correlations for individual signals. The system then projects the synthesized signals into the future to produce a load forecast. During this process, the synthesized signals produced by TPSS are normalized to account for real-time localized ambient temperatures based on historical archived weather measurements. (For a more-detailed description of TPSS, please see "Spectral Decomposition and Reconstruction of Telemetry Signals from Enterprise Computing Systems," K. C. Gross and E. Schuster, Proc. 2005 IEEE International Multiconference in Computer Science & Computer Eng., Las Vegas, Nev., June 2005.)

While generating the TPSS projections, we project the stochastic components on the individual AMI signals in a manner that produces a negligibly small bias in the aggregation of the projections. We then subtract the high fidelity TPSS composite signals, which possess all the cross-correlation and serial-correlation structure of the measured AMI signals, from the AMI signals to generate a "residual time series" signal. These residual time series signals, which are generated for each of the AMI signals, represent the "stochastic" noise elements, reflecting the randomness of household (or business) uses of electricity. We then compute the 2nd, 3rd, and 4th moments of the distribution for each stochastic residual time series (i.e., we compute variance, skewness, and kurtosis). Now, in order to generate our TPSS projections, we add stochastic noise that possesses exactly the same distribution parameters as the real signals. Note that for aggregation of the forecast loadshapes, it does not matter whether the exact observations from the stochastic components predict when a homeowner is going to randomly run the washer/dryer in the middle of the night. It matters only that we do not introduce any bias into the aggregates of the projected loadshapes, as long as we ensure that the stochastic distribution parameters (variance, skewness, kurtosis) are the same for the measured AMI signals as for the projected AMI signals, and there is near-zero bias. Moreover, when the projected loadshapes are aggregated, the stochastic elements cancel each other out when there are a large number of AMI signals. Moreover, the larger the number of AMI signals, the smaller the resulting noise for the aggregates. In fact, both theoretical and empirical investigations to validate this effect show that the "variance in the aggregates" varies inversely with the square root of the number of AMI signals. Because utilities often have hundreds of thousands to millions of home and business customers, the variance in such aggregated loadshape forecasts for a typical utility is very close to zero.

The disclosed techniques also perform an "ambient temperature normalization" operation to compensate the demand forecast for variations in weather. Note that electricity demand across a large metropolitan area has seasonal components caused by outside ambient temperature, and to a lesser extent relative humidity, along with diurnal variations caused by ambient temperature variations throughout a 24-hour period, and then additional time-of-day and day-of-week variations in human activity for sleep-versus-wake patterns and work-versus-leisure-activity patterns. Superimposed on these serially correlated patterns are stochastic variations in individual meters from irregular appliance usage, vacations, and random events that do not vary with ambient temperature, time of year, or time of day.

The system performs the ambient-temperature normalization operation as follows. The system retains a historical database of AMI signals, comprising at least two years of archived signals. Note that we need at least two years of AMI data to "learn" annual seasonality. The system then uses the ambient temperature signals to divide the AMI signals into temperature-graduated "buckets," for example from 10-20° F., 20-30° F., . . . , 90-100° F. Next, the system uses the time series "chunks" in the separate ambient-temperature buckets to train individual MSET models, which correspond to the appropriate temperature buckets. The system then stores the ambient-temperature-normalized training modules in a library to facilitate real-time projection using TPSS. During this projection process, TPSS uses highly accurate and random-noise-robust inferential signals. These inferential signals are computed with an ambient-temperature-normalized MSET module from the library in accordance with the present ambient temperature conditions.

The above-described forecasting technique increases the accuracy of "look-ahead loadshape projection" for utility systems. Doing so enables the utility systems to maximize revenue by continuously using the lowest-cost base-load generation, and by intelligently contracting in real-time for expensive spot-market grid electricity when demand is ramping up faster than the base-load generation can accommodate. Note that with conventional approaches, utilities either lose money by overestimating their real-time spot-market grid purchases, or lose money by underestimating their spot-market grid purchases and having to pay even higher rates when large purchases are needed to avoid blackouts during peak demand times. Utilities can save substantial money on their real-time spot-market grid purchases by having even a four-hour look-ahead loadshape window, which this technique provides with an extremely robust, high-accuracy combination of machine-learning techniques that has not been used in previous loadshape forecasting approaches.

Similarly, when demand is falling faster than anticipated, and there is an excess supply of electricity from inexpensive base-load generation, the utility can offer excess electricity on the grid. This enables other utilities in other regions to purchase the excess electricity, thereby increasing the utility's return on investment for their base-load generating capacity. Therefore, by using this technique, utilities can benefit, whether demand is ramping up with a hot weather period superimposed on the normal diurnal demand curves, or ramping down with a cool front moving through, again superimposed on the normal diurnal demand curves. The demand forecasting is facilitated through continuous analysis of the historical AMI meter data, synthesized into highly robust "inferential signals" using "ambient-temperature normalized" training modules, which are stored and continuously updated in a library. These inferential signals are then projected using a Fourier-based TPSS approach, which does not overshoot or undershoot the further into the future one projects (as do conventional approaches based on naïve least-square polynomial fits or autoregressive moving average techniques).

The conventional approach used by utilities to forecast electricity demand is based on bulk loadshape curves obtained from the generation side. In contrast, the new approach analyzes numerous individual AMI time series from the demand side. The reason the new approach is superior is that there are localized variations in demand that can be modeled far more accurately based on individual demand signals than is possible through bulk distribution signals, such as the megawatt output from individual generating plants in the utility generation-and-distribution grid. These localized variations in demand include ambient thermal influences on homes and businesses running air conditioners with thermostats at fixed set points. Moreover, note that many of the largest cities in the United States are near large bodies of water, such as the Great Lakes, an ocean, or the Gulf of Mexico. When this is the case, the diurnal variations in afternoon versus night-time temperatures have significantly smaller swings for the businesses and homes located near the large body of water, versus 10 miles inland, where diurnal peak-trough swings can be 20° F. greater simply because they do not have the large body of "thermal inertia" as do the coastal regions. Other localized perturbations include neighborhood outages from a damaged transmission line or an individually failing transformer. When a utility only projects load from the bulk aggregate generation loadshape, there may be a small step-change in bulk load from a localized outage, but there is no way of knowing whether that small step-change is for a business district that may be ramping up their demand as part of their business cycle, or residences where people leaving for work in the morning cause loads to ramp down.

In the past, MSET has been used to generate inferential signals, but for a fundamentally different use case: detecting when a sensor fails and then substituting an "analytical sensor" signal obtained from the inferential estimates. To our knowledge, this is the first time that MSET is being used to make inferential estimates that possess the underlying structure of the real AMI signals. By using the "inferential estimates" that accurately reflect the underlying structure of the AMI signals, we are in essence filtering out the randomness in the individual signals, which reduces the variances on our final loadshape projections, but does not introduce a bias in those estimates because the random perturbations on the individual signals cancel each other out during the TPSS projection procedure.

For non-random, neighborhood-wide variations in demand (for example, for a city hosting a Super Bowl, which experiences a one-time large variation in city-wide electricity demand on Super Bowl Sunday afternoon, or a catastrophic world event that causes a large part of the population to turn on their TVs at the same time), those "temporally random" but metropolitan-wide events will introduce a correlated variation across many signals and will be reflected in real-time in the MSET estimates. However, for random perturbations in individual AMI signals, the new technique filters out the randomness from the individual AMI signals, but then adds back in randomness that possesses exactly the same distribution parameters (variance, skewness, kurtosis) onto the TPSS projected loadshapes.

Note that the TPSS technique works well in signals for which the determinist structure includes periodicities, and electricity consumption is full of periodicity envelopes caused by: seasonal variations in ambient temperature and/or humidity; diurnal 24-hour variations in ambient temperature and/or humidity; diurnal variations in human sleep and/or work activity; and cyclic control cycles for large-amperage appliances, such as air conditioners that operate with a fixed set point, pool pumps set with 24-hour on/off cycles, and lights that are programmed to be on at night and off during the day.

TPSS also works well for the loadshape projection because that projection is based on an envelope of superimposed sine/cosine "learned" functions, which means the TPSS approach will not ever overshoot or undershoot the further into the future one projects—as do conventional approaches based on naïve least-square polynomial fits or autoregressive moving average approaches.

Figure 3:
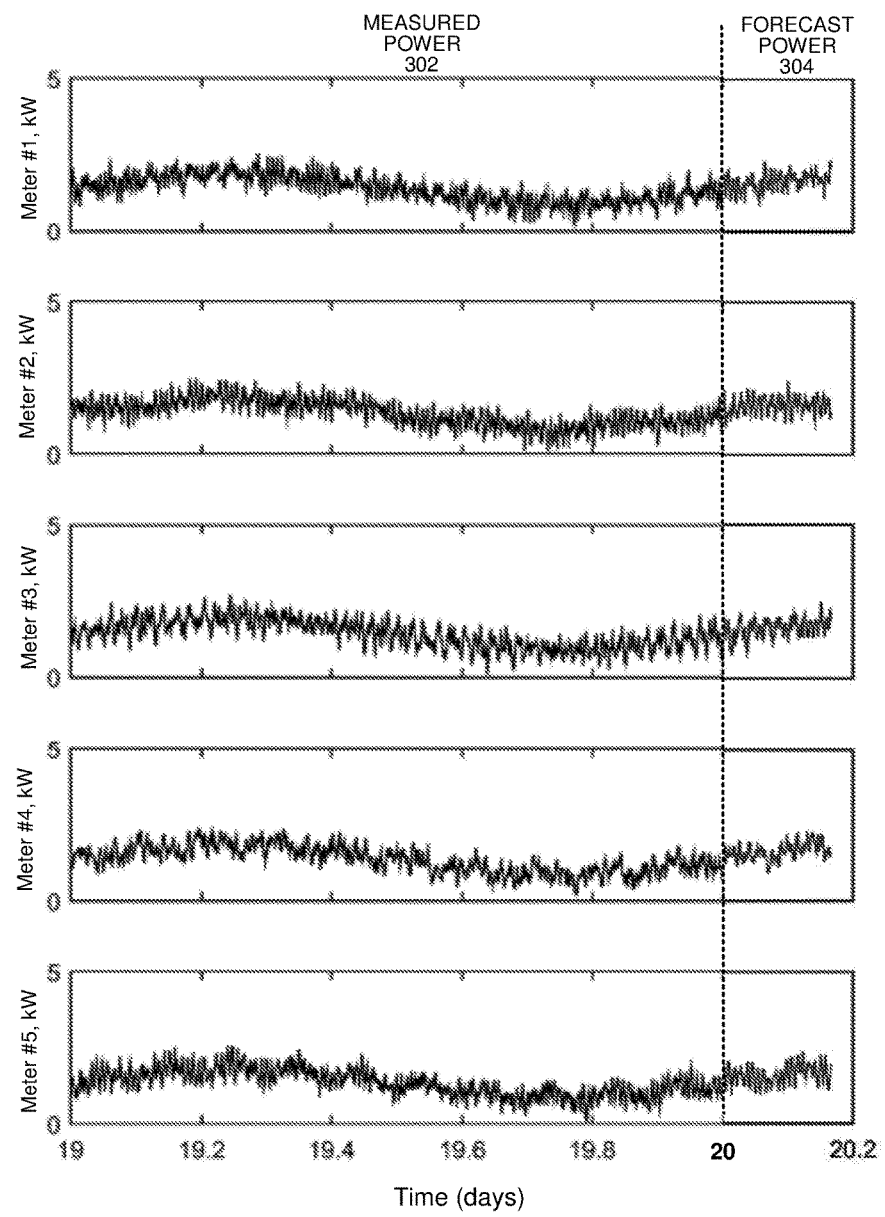
FIG. 3 presents a set of graphs illustrating both measured and forecast power usage associated with individual smart meters in accordance with the disclosed embodiments.

In one embodiment, we project the TPSS forecast four hours into the future. However, the forecast computation is performed more frequently than once every four hours; for example, it can be performed once an hour or even once every 15 minutes. See FIG. 3 which displays both measured power 302 and also four hours of forecast power 304 for an exemplary set of five smart meters. Utilities can obtain a tremendous benefit from four-hour look-ahead projections. At present, utilities typically only compute their conventional supply-side projections one hour ahead because the techniques they use, which involve extrapolating supply-side loadshape curves, become inaccurate in making forecasts more than an hour into the future. Moreover, utilities obtain diminishing returns by projecting beyond the next four hours because of the way that real-time spot-market grid arbitration sales and purchases are conducted.

Exemplary Prognostics System

FIG. 1 illustrates an exemplary utility system 100 comprising a set of generating stations 102-104 connected to homes and businesses 110 through an electrical grid 106 in accordance with the disclosed embodiments. Note that generating stations 102-104 can generally include any type of facility that generates electricity, such as a nuclear power plant, a solar power plant, a wind mill or a wind mill "farm", or a coal-fired, natural gas or oil-burning power plant. Generating stations 102-104 connect into electrical grid 106, which can transfer electricity to homes and businesses 110 within a region served by utility system 100, and can also transfer electricity to and from other utility systems. Note that electrical grid 106 transfers electricity to homes and businesses 110 through individual smart meters 108, which periodically transmit AMI signals containing electrical usage data, including kilowatt measurements and kilowatt-hour measurements, to a data center 120.

A control system within datacenter 120 receives the AMI signals from smart meters 108 along with weather data 112, comprising historic, current and forecasted weather information, and produces a load forecast, which is used to control generating stations 102-104 and other operations of electrical grid 106. The operations involved in computing this load forecast are discussed in more detail below.

Generating a Loadshape Forecast

Figure 2:
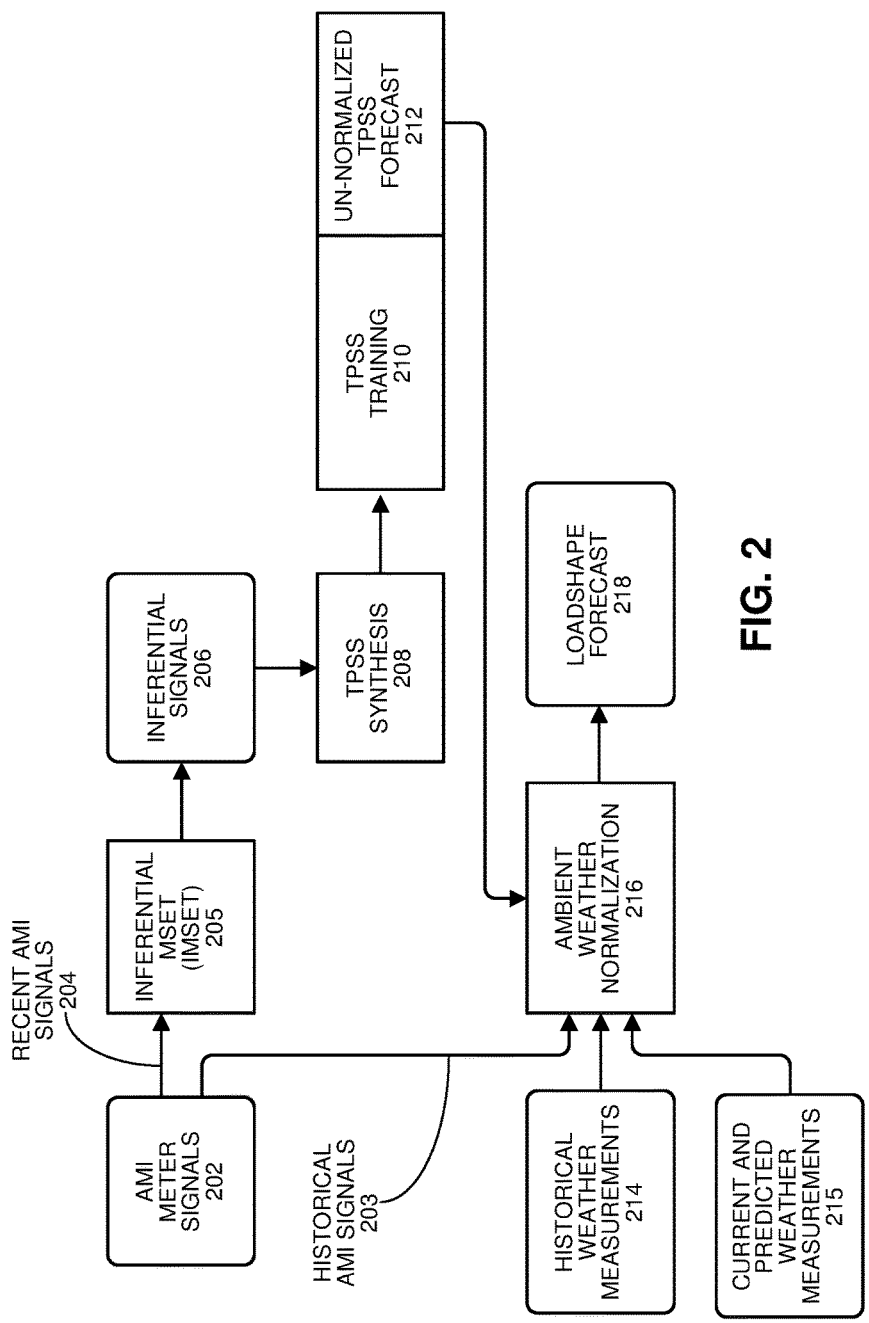
FIG. 2 presents a flow diagram illustrating how an optimal loadshape forecast is computed in accordance with the disclosed embodiments.

FIG. 2 presents a flow diagram illustrating how the above-described system computes optimal loadshape forecast 218 in accordance with the disclosed embodiments. The system starts with AMI meter signals 202 obtained from numerous smart meters by a utility system. As illustrated in FIG. 2, these AMI meter signals 202 comprise both historical AMI signals 203 and recent AMI signals 204. The system feeds the recent AMI signals 204 into an inferential MSET module 205, which trains an inferential model to learn correlations among the recent AMI signals 204, and then uses the trained inferential model to produce a set of inferential signals 206. Next, the system feeds the inferential signals 206 into a TPSS synthesis module 208 that performs a TPSS training operation 210, which decomposes each signal into the set of inferential signals 206 into deterministic and stochastic components, and then uses the deterministic and stochastic components to generate a corresponding set of synthesized signals, which are statistically indistinguishable from the inferential signals. Finally, the system projects the set of synthesized signals into the future to produce an un-normalized TPSS forecast 212 for the electricity demand for the set of utility customers.

Next, the system feeds the un-normalized TPSS forecast 212 into an ambient weather normalization module 216, which normalizes the un-normalized TPSS forecast 212 to account for variations in electricity usage caused by predicted changes in ambient weather. This normalization process involves analyzing historical AMI signals 203 with respect to historical weather measurements 214 to determine how AMI meter signals 202 change for different weather patterns. The normalization process then uses current and predicted weather measurements 215 to modify the un-normalized TPSS forecast 212 to account for the predicted weather conditions. This produces a final loadshape forecast 218, which can be used by the utility system to perform various operations as mentioned above to control a supply of electricity provided by the utility system.

Figure 4:
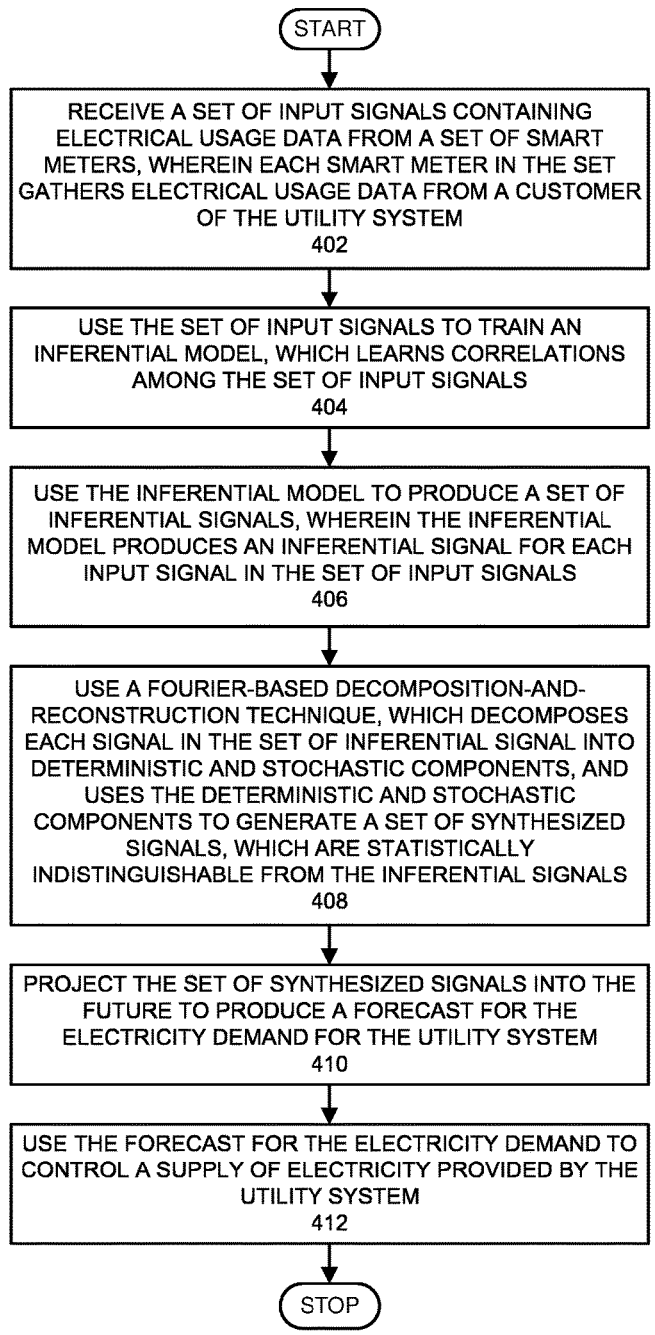
FIG. 4 presents a flow chart illustrating operations involved in generating an optimal loadshape forecast in accordance with the disclosed embodiments.

More specifically, FIG. 4 presents a flow chart illustrating operations involved in generating an optimal loadshape forecast in accordance with the disclosed embodiments. During operation, the system receives a set of input signals containing electrical usage data from a set of smart meters, wherein each smart meter in the set gathers electrical usage data from a customer of the utility system (step 402). Next, the system uses the set of input signals to train an inferential model, which learns correlations among the set of input signals (step 404), and then uses the inferential model to produce a set of inferential signals, wherein the inferential model produces an inferential signal for each input signal in the set of input signals (step 406). The system then uses a Fourier-based decomposition-and-reconstruction technique, which decomposes each signal in the set of inferential signals into deterministic and stochastic components, and uses the deterministic and stochastic components to generate a set of synthesized signals, which are statistically indistinguishable from the inferential signals (step 408). Next, the system projects the set of synthesized signals into the future to produce a forecast for the electricity demand for the set of utility customers (step 410). Finally, the system uses the forecast for the electricity demand to control a supply of electricity provided by the utility system (step 412).

Figure 5:
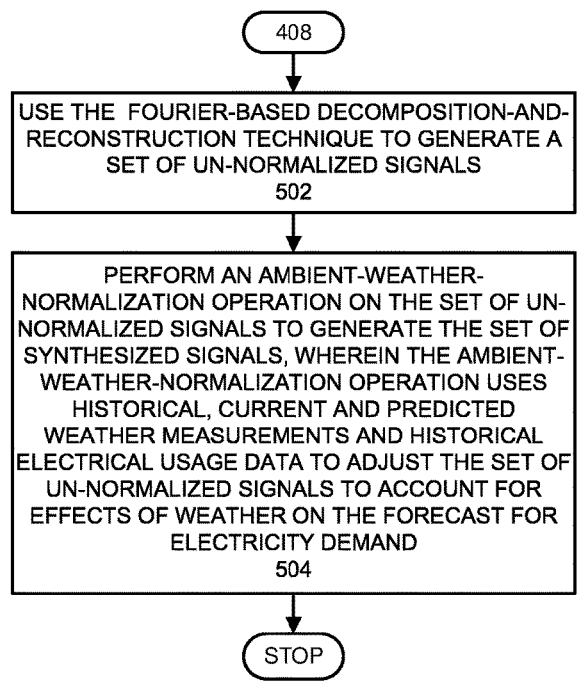
FIG. 5 presents a flow chart illustrating operations involved in performing a Fourier-based decomposition-and-reconstruction technique in accordance with the disclosed embodiments.

FIG. 5 presents a flow chart illustrating operations involved in performing the Fourier-based decomposition-and-reconstruction technique described in step 408 above in accordance with the disclosed embodiments. The system first uses the Fourier-based decomposition-and-reconstruction technique to generate a set of un-normalized signals (step 502). Next, the system performs an ambient-weather-normalization operation on the set of un-normalized signals to generate the set of synthesized signals, wherein the ambient-weather-normalization operation uses historical, current and predicted weather measurements and historical electrical usage data to adjust the set of un-normalized signals to account for effects of weather on the forecast for electricity demand (step 504).

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for forecasting electricity demand for a utility system, comprising:
   receiving a set of input signals containing electrical usage data from a set of smart meters, wherein each smart meter in the set gathers electrical usage data from a customer of the utility system;
   using the set of input signals to train an inferential model, which learns correlations among the set of input signals;
   using the inferential model to produce a set of inferential signals, wherein the inferential model produces an inferential signal for each input signal in the set of input signals;
   using a Fourier-based decomposition-and-reconstruction technique, which decomposes each signal in the set of inferential signals into deterministic and stochastic components, and uses the deterministic and stochastic components to generate a set of synthesized signals, which are statistically indistinguishable from the inferential signals; and
   projecting the set of synthesized signals into the future to produce a forecast for the electricity demand for the utility system; using the forecast for the electricity demand to control a supply of electricity provided by the utility system.

2. The method of claim 1, wherein controlling the supply of electricity provided by the utility system comprises one or more of the following:
   controlling an amount of electricity produced by one or more power plants in the utility system;
   purchasing electricity for the utility system through a power grid;
   selling electricity produced by the utility system through the power grid;
   storing electricity for future use by the utility system; and
   making plans to construct a new power plant for the utility system.

3. The method of claim 1, wherein generating the set of synthesized signals comprises:
   generating a set of un-normalized signals; and
   performing an ambient-weather-normalization operation on the set of un-normalized signals to generate the set of synthesized signals, wherein the ambient-weather-normalization operation uses historical, current and predicted weather measurements and historical electrical usage data to adjust the set of un-normalized signals to account for effects of weather on the forecast for electricity demand.

4. The method of claim 1, wherein receiving the set of input signals comprises receiving a set of advanced metering infrastructure (AMI) signals.

5. The method of claim 1, wherein the inferential model is trained using a nonlinear, nonparametric (NLNP) regression technique.

6. The method of claim 5, wherein the NLNP regression technique comprises a Multivariate State Estimation Technique (MSET).

7. The method of claim 1, wherein using the Fourier-based decomposition-and-reconstruction technique to generate the set of synthesized signals comprises using a telemetry parameter synthesis (TPSS) technique, which creates a high-fidelity synthesis equation that is used to generate the set of synthesized signals.

8. The method of claim 1, wherein the electrical usage data comprises kilowatt measurements and kilowatt-hour measurements.

9. A non-transitory computer-readable storage medium storing instructions that when executed by a computer cause the computer to perform a method for forecasting electricity demand for a utility system, the method comprising:
   receiving a set of input signals containing electrical usage data from a set of smart meters, wherein each smart meter in the set gathers electrical usage data from a customer of the utility system;
   using the set of input signals to train an inferential model, which learns correlations among the set of input signals;
   using the inferential model to produce a set of inferential signals, wherein the inferential model produces an inferential signal for each input signal in the set of input signals;
   using a Fourier-based decomposition-and-reconstruction technique, which decomposes each signal in the set of inferential signals into deterministic and stochastic components, and uses the deterministic and stochastic components to generate a set of synthesized signals, which are statistically indistinguishable from the inferential signals; and
   projecting the set of synthesized signals into the future to produce a forecast for the electricity demand for the utility system using the forecast for the electricity demand to control a supply of electricity provided by the utility system.

10. The non-transitory computer-readable storage medium of claim 9, wherein controlling the supply of electricity provided by the utility system comprises one or more of the following:
    controlling an amount of electricity produced by one or more power plants in the utility system;
    purchasing electricity for the utility system through a power grid;
    selling electricity produced by the utility system through the power grid;
    storing electricity for future use by the utility system; and
    making plans to construct a new power plant for the utility system.

11. The non-transitory computer-readable storage medium of claim 9, wherein generating the set of synthesized signals comprises:
    generating a set of un-normalized signals; and
    performing an ambient-weather-normalization operation on the set of un-normalized signals to generate the set of synthesized signals, wherein the ambient-weather-normalization operation uses historical, current and predicted weather measurements and historical electrical usage data to adjust the set of un-normalized signals to account for effects of weather on the forecast for electricity demand.

12. The non-transitory computer-readable storage medium of claim 9, wherein receiving the set of input signals comprises receiving a set of advanced metering infrastructure (AMI) signals.

13. The non-transitory computer-readable storage medium of claim 9, wherein the inferential model is trained using a nonlinear, nonparametric (NLNP) regression technique.

14. The non-transitory computer-readable storage medium of claim 13, wherein the NLNP regression technique comprises a Multivariate State Estimation Technique (MSET).

15. The non-transitory computer-readable storage medium of claim 9, wherein using the Fourier-based decomposition-and-reconstruction technique to generate the set of synthesized signals comprises using a telemetry parameter synthesis (TPSS) technique, which creates a high-fidelity synthesis equation that is used to generate the set of synthesized signals.

16. The non-transitory computer-readable storage medium of claim 9, wherein the electrical usage data comprises kilowatt measurements and kilowatt-hour measurements.

17. A system that forecasts electricity demand for a utility system, comprising:
   at least one processor and at least one associated memory; and
   a forecasting mechanism that executes on the at least one processor, wherein during operation, the forecasting mechanism:
      receives a set of input signals containing electrical usage data from a set of smart meters, wherein each smart meter in the set gathers electrical usage data from a customer of the utility system;
      uses the set of input signals to train an inferential model, which learns correlations among the set of input signals;
      uses the inferential model to produce a set of inferential signals, wherein the inferential model produces an inferential signal for each input signal in the set of input signals;
      uses a Fourier-based decomposition-and-reconstruction technique, which decomposes each signal in the set of inferential signals into deterministic and stochastic components, and uses the deterministic and stochastic components to generate a set of synthesized signals, which are statistically indistinguishable from the inferential signals; and
   projects the set of synthesized signals into the future to produce a forecast for the electricity demand for the utility system uses the forecast for the electricity demand to control a supply of electricity provided by the utility system.

* * * * *

UNITED STATES PATENT AND TRADEMARK OFFICE
CERTIFICATE OF CORRECTION

PATENT NO. : 10,310,459 B2
APPLICATION NO. : 15/715692
DATED : June 4, 2019
INVENTOR(S) : Gross et al.

Page 1 of 1

It is certified that error appears in the above-identified patent and that said Letters Patent is hereby corrected as shown below:

In the Claims

In Column 10, Line 28, in Claim 9, delete "system" and insert -- system; --, therefor.

In Column 12, Line 18, in Claim 17, delete "system" and insert -- system; --, therefor.

Signed and Sealed this
Twenty-fifth Day of May, 2021

Drew Hirshfeld
*Performing the Functions and Duties of the*
*Under Secretary of Commerce for Intellectual Property and*
*Director of the United States Patent and Trademark Office*